Aug. 10, 1943. W. L. BENEDICT 2,326,323
CATALYST MANUFACTURE
Filed Feb. 10, 1941
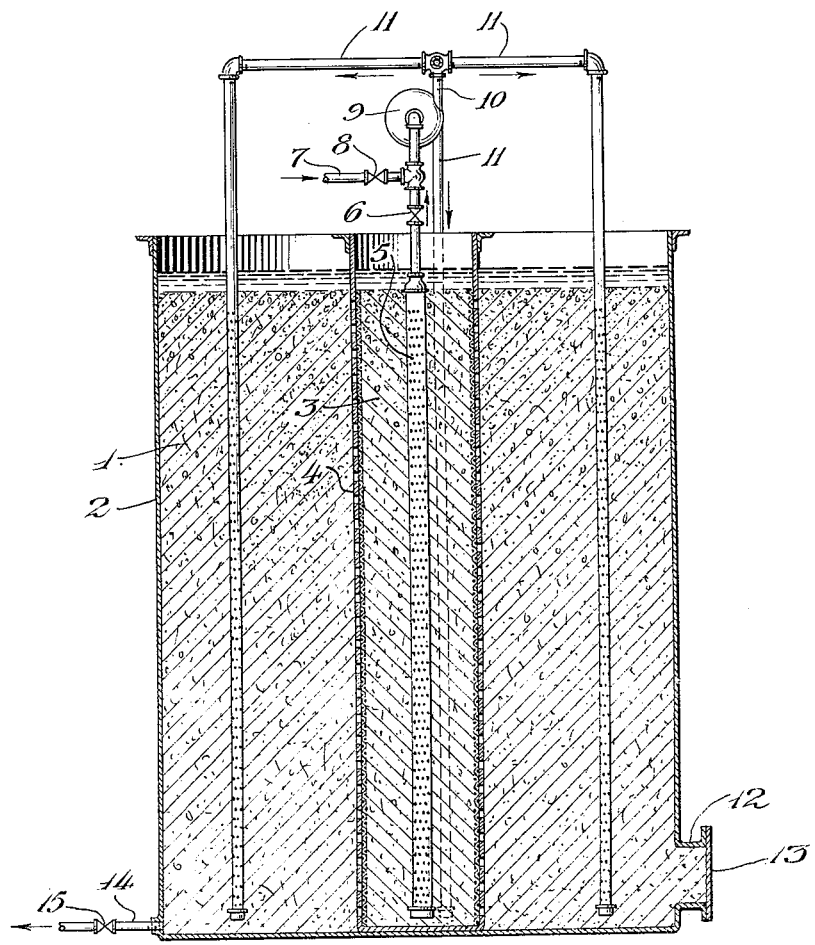

Patented Aug. 10, 1943

2,326,323

UNITED STATES PATENT OFFICE 2,326,323

CATALYST MANUFACTURE

Wayne L. Benedict, Chicago, Ill., assignor to Universal Oil Products Company, Chicago, Ill., a corporation of Delaware Application February 10, 1941, Serial No. 378,120

5 Claims. (Cl. 252—236)

This invention relates to improvements in the process for manufacturing catalytic agents which must be treated to remove soluble alkali- or alkaline-earth-metal compounds prior to use as a catalyst. More particularly, the process comprises a method of purifying hydrogels which are formed in one step of catalyst manufacturing processes.

Synthetic catalytic agents, composed essentially of precipitated silica and precipitated alumina with or without added promoting materials, have been found useful for numerous reactions such as hydrocarbon conversion, catalytic cracking, catalytic reforming, isomerization, etc. Some of these synthetic contact materials have little or no value when used in the impure state but when washed substantially free of alkaline constituents such as compounds of sodium, the finished composites possess a superlative degree of catalytic activity of a desirable character for converting hydrocarbons into useful products. The exact stage in the sequence of manufacturing steps at which washing is carried out depends, to a large extent, upon the particular method of manufacture and the particular form in which the catalyst is to be used. The present invention has its greatest application in connection with composites which are difficult to wash, and particularly in the manufacture of shapes such as pills, spheres, and the like, which are formed by the extrusion of the components while in a plastic or semi-plastic form, or where the plastic gel is to be broken into granules and dried. Thus, for example, silica alone or in conjunction with other oxides such as alumina may be precipitated to form hydrogels by treating soluble silicates with an acid, heavy metal salt solutions, etc.

The voluminous, gelatinous mass formed in the operation is difficult to filter and wash because of the slimy, jelly-like character of the material. The gel is composed of a relatively minor amount of solids, usually from 10 to 25% by weight, in a relatively large amount of water. The material may be allowed to set and be broken into lumps but these tend to disintegrate if handled excessively during washing unless they are dried to a point at which the mixture loses its plastic properties and, therefore, cannot be extruded, or broken into granules and dried to form contact masses. As a consequence, washing the gel by the usual methods of forming slurries with excess water and then filtering is expensive since the amount of water required is large and the time and equipment consumed in the operation is extensive. The hydrogels can, of course, be dried and ground to a fine powder which superficially resembles sand and may then be formed into pellets by the compression methods such as briquetting or pilling. These operations are expensive because precision equipment is required and the abrasive character of the dry gel results in high replacement of equipment, particularly when pilling machines of a punch and die type are used.

On the other hand, it is possible to extrude the gel while in plastic form, using well-known types of machines wherein the material is passed through dies of the desired diameter and the material is cut or broken into particles of the desired length. These may then be dried and calcined after which they are ready to use. If, however, the dried or calcined particles are washed they tend to disintegrate and in some cases the catalytic properties are impaired. As a consequence, the composite is best washed while still in the undried gel stage.

The present invention offers a method of purifying catalytic composites while in the plastic or semi-plastic gel stage in order that they may be subsequently formed into regular shapes, granules, etc., dried, and finally calcined to produce catalytic masses.

In one specific embodiment the present invention comprises an improvement in processes for manufacturing catalysts which must be purified and which are difficult to wash because of their gel-like character and particularly composites of the synthetic hydrogel type wherein the components of said composite are precipitated and formed into a semi-plastic gel, which comprises subjecting said composites to the action of an ion exchange zeolite whereby the soluble alkali- or alkaline-earth-metal compounds are removed substantially completely, leaving the purified gel in a form which may be readily filtered and formed into particles of the desired shape and size. These particles may then be subjected to a final drying and/or calcining treatment to produce the finished catalytic composite.

The accompanying drawing illustrates diagrammatically apparatus for conducting one method of the present invention. The invention is not, however, limited to this particular embodiment, but may be effected in any suitable manner whereby the material being purified is treated with the zeolite. The object is to keep the concentration of the impurities dissolved in the water as low as possible in order to facilitate their rapid removal from the gel, and at the same time to avoid using large quantities of water which necessitates relatively long time for washing. Rapid rates of flow tend to cause the gel particles to disintegrate, if lumps of gel are used, and if a slurry of gel is used rapid rates of washing are usually impossible because the material filters with difficulty.

The invention should not be confused with systems in which the wash water is withdrawn, passed through a zeolite softener and returned to the washer since in that case the ultimate volume of water (recirculated) pumped would be the same as though fresh water were used throughout and the filtering problem would not be overcome. In the present invention the gel and the zeolite are maintained in the same system and the flow of water between gel and zeolite is at all times gentle, usually being by diffusion alone, although slow circulation may be induced mechanically as indicated below.

Referring to the drawing, composite material to be washed, 1, comprising particles of gel or a suspension of gel in water is placed within container 2 and covered with water. Receptacle 2 may be any suitable vessel or container. A hydrogen exchange zeolite 3 is placed in a porous container 4 which is set in receptacle 2. The container 4 may be in any suitable form such as a metal basket or may comprise a porous cup or other device to keep the zeolite separated from the catalyst particles but at the same time to permit a relatively free flow of liquid through the walls thereof. A sufficient amount of zeolite may be placed in container 4 to take up the soluble impurities, and particularly sodium compounds, which may be found in the gel. The reaction can be allowed to take place merely by diffusion of the sodium-containing water into the basket 4 containing the zeolite.

Due to the exchange reaction, hydrogen ions are displaced in the zeolite and are replaced by sodium ions from the solution. In this way the sodium or other alkali- or alkaline-earth-metal compounds become fixed and are no longer present in the soluble form.

An increased rate of washing can be obtained by pumping the water from the basket 4 through a perforated pipe 5 having valve 6 by means of pump 9. If this is done, however, the rate of pumping should be slow so that the pressure drop is slight; otherwise, the object of the invention will not be accomplished and the perforations in the basket 4 may become clogged with gel. Additional water may be added to the system as required through line 7 and valve 8. The water may be pumped under a slight pressure through a pipe 10 and perforated pipes 11 and thus passed into the outer vessel.

Sufficient water is used to keep the material being washed covered at all times. The water used is usually neutral although it may be slightly acidic to assist in dissolving impurities out of the gel.

When the gel has been sufficiently purified and when the zeolite is no longer capable of removing sodium compounds from the water the purified material is removed from vessel 2 by means not shown and may be filtered to remove excess water. It may then be extruded through dies of the proper size and, as previously indicated, cut or broken into particles of the desired length which are then dried and finally calcined to form the finished catalyst.

Alternatively the purified gel may be molded or compressed into various shapes or forms or may be broken into lumps or granules. The spent zeolite may be treated with a dilute solution of hydrochloric acid or other mineral acid whereby the sodium is liberated from the zeolite and replaced by hydrogen ions. After revivification it is used to treat additional batches of the catalyst gel. Liquids may be withdrawn from the vessel through line 14 containing valve 15.

When reference is made to "sodium compounds" it is intended that all of the soluble alkali- or alkaline-earth-metal compounds may be removed in this manner if they are present. It is not intended that the terms shall be limited strictly to sodium compounds although, in the ordinary course of events, compounds of potassium, lithium, calcium, and the like are usually present in minor amounts only.

The gel type catalysts referred to may be manufactured by the separate or simultaneous precipitation of the components of the finished catalytic mass under such conditions that a hydrogel, semi-plastic in character, is formed. Methods of forming such gels have been explained at length in patents and published articles and need not be described in detail. In general, silica containing gels are precipitated by treating soluble silicate solutions such as water glass with acids such as hydrochloric, sulfuric, and the like. As a result a hydrated silica gel is precipitated and if the precipitation is carried out under proper conditions the gel stiffens and may be broken into lumps, which retain their form only if handled carefully. Moreover, the gel may be formed into a slurry in water and filtered off in a comparatively dry cake composed of approximately 80–90% water and 10–20% solids. When using the present process the gel is preferably treated in the form of lumps although it may be made into a more or less uniform slurry which is placed in the washing vessel.

Any zeolites may be used in which the alkali metal ion may be replaced by base exchange action with hydrogen ions and vice versa.

By means of the present invention a silica-alumina catalyst was manufactured by successively precipitating silica gel from a sodium silicate solution by means of dilute hydrochloric acid followed by a superficial washing of the precipitated gel to remove a portion of the soluble compounds. Usually one or two washes is all that is given the gel at this point. The gel was then formed into a slurry in an excess of water and a solution of aluminum chloride was added. Ammonium hydroxide was added to the mixture to precipitate aluminum hydroxide. The mixture was then filtered and, after being allowed to set for several hours, was broken into lumps of approximately ½" to 1" diameter and placed in a vessel of the general construction described in the accompanying drawing wherein it was covered with distilled water. The zeolite used was a granular form and was placed in a porous earthenware cup in the vessel. In this manner the sodium content of the catalyst was reduced until sodium was no longer detected by the magnesium uranyl acetate test described in Ind. Eng. Chem., analytical ed., 6, 202 (1934).

The purified gel was then filtered to remove the last traces of water and was extruded through an 0.25" die and cut into lengths approximately 0.25" long. After drying at a temperature which never exceeded 300° F. the particles were approximately half their original dimensions due to shrinkage. These particles were calcined for one hour at 1500° F. and were used to catalytically crack Pennsylvania gas oil at a temperature of approximately 950° F. and substantially atmospheric pressure. The catalytic activity was approximately the same as that of a catalyst similar in chemical composition but which was prepared by drying the precipitated gels and grinding into a powder which was formed $1/8''$ x $1/8''$ pills in a punch- and die-type pilling machine. The cost of catalyst manufacture was reduced by the method of the present invention to approximately half that of the latter operation. Similar catalysts comprising silica-alumina-zirconia, silica-alumina-thoria, silica-zirconia, etc. may be made and purified as described.

It should be understood that the present invention is not strictly limited to catalysts of the character described but may be utilized in connection with any gel-type catalyst wherein a high degree of purity is desired and which for purposes of further use should be purified while in the undried gel form.

In the appended claims, the term "alkalinous metal" is employed as a genus for the alkali metals and the alkaline earth metals.

I claim as my invention:

1. A method for removing alkalinous metal ions from gels containing the same which comprises maintaining the gel in contact with water in a zone contiguous to a mass of ion exchange material, said mass being separated from said zone by a dividing wall capable of permitting flow of water between said zone and said mass, and transferring alkalinous metal ions from the gel to said mass through the medium of the flowing water.

2. The method as defined in claim 1 further characterized in that the flow of water between said zone and said mass is effected primarily by diffusion through said wall.

3. The method as defined in claim 1 further characterized in that the flow of water between said zone and said mass is mechanically induced.

4. A method for removing alkalinous metal ions from gels containing the same which comprises maintaining the gel in contact with water in a first zone, maintaining a mass of ion exchange material in a second zone, and circulating water from the first zone through said mass in the second zone and then back to the first zone.

5. The method as defined in claim 1 further characterized in that said gel comprises hydrated silica.

WAYNE L. BENEDICT.